United States Patent
Yodogawa et al.

(10) Patent No.: US 8,785,563 B2
(45) Date of Patent: *Jul. 22, 2014

(54) CROSS-LINKABLE FLUOROELASTOMER EXCELLENT IN CROSS-LINKABILITY AND METHOD FOR ITS PRODUCTION

(75) Inventors: Masahide Yodogawa, Chiyoda-ku (JP); Masayuki Saito, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 638 days.

This patent is subject to a terminal disclaimer.

(21) Appl. No.: 12/754,650

(22) Filed: Apr. 6, 2010

(65) Prior Publication Data
US 2010/0196709 A1 Aug. 5, 2010

Related U.S. Application Data

(63) Continuation of application No. PCT/JP2008/069808, filed on Oct. 30, 2008.

(30) Foreign Application Priority Data

Nov. 20, 2007 (JP) ................. 2007-300223

(51) Int. Cl.
*C08F 14/18* (2006.01)

(52) U.S. Cl.
USPC ............... 525/326.2; 525/326.3; 525/333.8; 525/387; 526/227; 252/186.42

(58) Field of Classification Search
USPC ................................. 428/379, 375
See application file for complete search history.

(56) References Cited

U.S. PATENT DOCUMENTS

| | | | |
|---|---|---|---|
| 4,148,982 A | 4/1979 | Morozumi et al. | |
| 4,770,937 A | 9/1988 | Yagyu et al. | |
| 4,931,499 A * | 6/1990 | Sakai et al. | 525/194 |
| 4,942,202 A * | 7/1990 | Zama et al. | 525/104 |
| 5,010,137 A * | 4/1991 | Umeda et al. | 525/104 |

(Continued)

FOREIGN PATENT DOCUMENTS

| | | | |
|---|---|---|---|
| EP | 0 317 346 A1 | 5/1989 | |
| EP | 0 600 090 A1 | 6/1994 | |

(Continued)

OTHER PUBLICATIONS

U.S. Appl. No. 12/911,996, filed Oct. 26, 2010, Yodogawa, et al.

(Continued)

*Primary Examiner* — Jill Gray
(74) *Attorney, Agent, or Firm* — Oblon, Spivak, McClelland, Maier & Neustadt, L.L.P.

(57) ABSTRACT

A cross-linkable fluoroelastomer remarkably excellent in cross-linkability and a method for its production, a fluoroelastomer composition excellent in the cross-linked physical properties, and a cross-linked rubber. A cross-linkable fluoroelastomer having a Mooney viscosity of from 20 to 300, obtainable by heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C.

14 Claims, 1 Drawing Sheet

(56) References Cited

U.S. PATENT DOCUMENTS

| | | | |
|---|---|---|---|
| 5,206,293 A * | 4/1993 | Sakai et al. | 525/194 |
| 7,173,094 B2 * | 2/2007 | Morimoto et al. | 525/326.3 |
| 7,220,788 B2 * | 5/2007 | Kuzawa et al. | 522/186 |
| 8,044,145 B2 * | 10/2011 | Yodogawa et al. | 525/326.2 |
| 2007/0276097 A1 | 11/2007 | Yodogawa et al. | |
| 2010/0196709 A1 * | 8/2010 | Yodogawa et al. | 428/390 |

FOREIGN PATENT DOCUMENTS

| | | |
|---|---|---|
| EP | 1 698 662 A1 | 9/2006 |
| EP | 1 860 123 A1 | 11/2007 |
| JP | 53-009848 | 1/1978 |
| JP | 54-001385 | 1/1979 |
| JP | 02-117944 | 5/1990 |
| JP | 2003-327772 | 11/2003 |
| JP | 2006-236866 | 9/2006 |

OTHER PUBLICATIONS

European Search Report issued Oct. 1, 2010, in Application No. 08852623.1-1214/2213702 PCT/JP2008069808.

* cited by examiner

CROSS-LINKABLE FLUOROELASTOMER EXCELLENT IN CROSS-LINKABILITY AND METHOD FOR ITS PRODUCTION

This application is a Continuation of PCT/JP08/69808 filed Oct. 30, 2018. Priority to Japan 2007-300223, filed Nov. 20, 2007, is claimed.

TECHNICAL FIELD

The present invention relates to a cross-linkable fluoroelastomer capable of exhibiting an excellent cross-linkability, a method for its production, a fluoroelastomer composition excellent in the cross-linked physical properties, and a cross-linked rubber.

BACKGROUND ART

A tetrafluoroethylene/propylene type copolymer (hereinafter referred to also as a TFE/P copolymer) is used as a rubber material remarkably excellent in the heat resistance and chemical resistance in such a severe environment that ordinary rubber materials are not durable. However, the TFE/P copolymer is poor in the cross-linkability at the time of producing a rubber product. As a method for improvement, a method of carrying out heat treatment at a high temperature for a long time was proposed (e.g. Patent Document 1). However, by such a method, the productivity was inadequate, since it required heat treatment at a high temperature over a long time. Further, when a fluoroelastomer composition obtained by incorporating various blend materials to the heat-treated TFE/P type copolymer obtained by this production method, was molded by means of a mold and cross-linked, the cross-linkability was not necessarily adequate.

Accordingly, it has been desired to develop a production method of a cross-linkable fluoroelastomer more excellent in the productivity, whereby functional groups excellent in cross-linkability can be introduced into the fluoroelastomer with high efficiency.

Patent Document 1: JP-A-53-9848

DISCLOSURE OF THE INVENTION

Object to be Accomplished by the Invention

It is an object of the present invention to provide a cross-linkable fluoroelastomer remarkably excellent in cross-linkability and a method for its production, a fluoroelastomer composition excellent in the cross-linked physical properties, and a cross-linked rubber.

Means to Accomplish the Object

The present inventors have found that when a fluoroelastomer having poor cross-linkability, an organic peroxide and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol are mixed, followed by heat treatment, the cross-linkability is remarkably improved. Further, it has been found that when the obtained cross-linkable fluoroelastomer composition is cross-linked, a cross-linked rubber excellent in the cross-linked rubber physical properties can be obtained. The present invention has been accomplished on the basis of this discovery.

That is, the present invention provides the following cross-linkable fluoroelastomer, method for its production, cross-linkable fluoroelastomer composition, and cross-linked rubber.

[1] A cross-linkable fluoroelastomer having a Mooney viscosity of from 20 to 300, obtainable by heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C.

[2] The cross-linkable fluoroelastomer according to [1], wherein the additive (C) is a $C_{12-28}$ higher fatty acid and/or its metal salt.

[3] The cross-linkable fluoroelastomer according to [1] or [2], wherein the blend ratio of fluoroelastomer (A)/organic peroxide (B)/additive (C) in the mixture is 100/0.1 to 10/0.1 to 10 (mass ratio).

[4] The cross-linkable fluoroelastomer according to any one of [1] to [3], wherein the fluoroelastomer (A) is a tetrafluoroethylene/propylene type copolymer.

[5] A method for producing a cross-linkable fluoroelastomer, which comprises heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C.

[6] The method for producing a cross-linkable fluoroelastomer according to [5], which comprises kneading and heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C. by means of an extruder.

[7] A cross-linkable fluoroelastomer composition comprising the cross-linkable fluoroelastomer as defined in any one of [1] to [4], a vulcanizer (D) and a vulcanization assistant (E).

[8] A cross-linked rubber product obtained by cross-linking the cross-linkable fluoroelastomer composition as defined in [7].

[9] A cross-linked rubber product obtained by cross-linking a molded product obtained by molding the cross-linkable fluoroelastomer as defined in any one of [1] to [4] by applying an ionizing radiation thereto.

[10] A cross-linked rubber product obtained by cross-linking a molded product obtained by molding the cross-linkable fluoroelastomer composition as defined in [7] by applying an ionizing radiation thereto.

[11] A cross-linked rubber coated electric wire obtained by applying a composition obtained by kneading the cross-linkable fluoroelastomer as defined in any one of [1] to [4] and an ethylene-tetrafluoroethylene type copolymer in a mass ratio of cross-linkable fluoroelastomer/ethylene-tetrafluoroethylene type copolymer=90/10 to 10/90, to an electric wire, followed by cross-linking by applying an ionizing radiation thereto.

Effects of Invention

The cross-linkable fluoroelastomer of the present invention is excellent in cross-linkability, and further, remarkably excellent in the productivity. Particularly, by mixing at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, carbon-carbon unsaturated bonds which are functional groups excellent in cross-linking reactivity, can be introduced effectively into the fluoroelastomer. Further, a cross-linked rubber product obtained by cross-linking the obtained cross-linkable fluoroelastomer is excellent in cross-linked rubber physical properties such as rubber elasticity, and excellent in heat resistance, chemical resistance, oil resistance, weather resistance, mold release characteristics, etc.

BEST MODE FOR CARRYING OUT THE INVENTION

Figure 1:
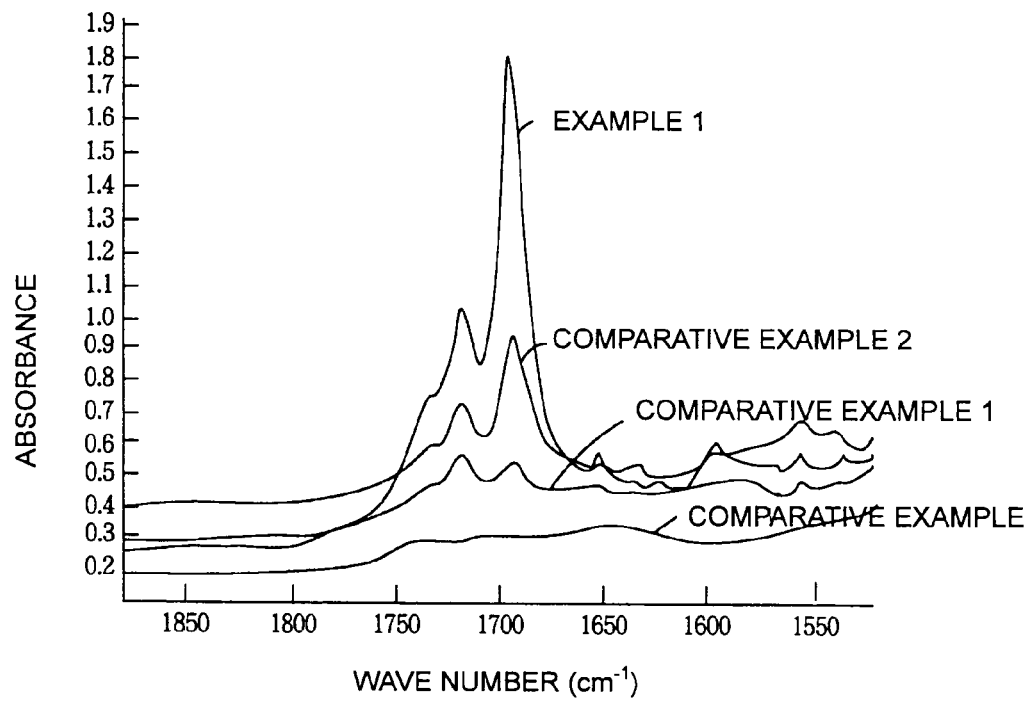
FIG. 1 is a chart showing infrared absorption spectra of one embodiment of the cross-linkable fluoroelastomer of the present invention and fluoroelastomers of the prior art.

As the fluoroelastomer (A) to be used in the present invention, a known fluoroelastomer having a hydrogen atom bonded to its main chain, may be employed. Particularly, a fluoroelastomer having no carbon-carbon unsaturated bonds may be suitably employed.

Specific examples of the fluoroelastomer (A) include a tetrafluoroethylene/propylene type copolymer, a tetrafluoroethylene/propylene/vinylidene fluoride type copolymer, a vinylidene fluoride/hexafluoropropylene type copolymer, and a vinylidene fluoride/hexafluoropropylene/tetrafluoroethylene type copolymer. Among them, a tetrafluoroethylene/propylene type copolymer poor in the cross-linkability is preferred.

The tetrafluoroethylene/propylene type copolymer may preferably be a tetrafluoroethylene (hereinafter referred to as TFE)/propylene (hereinafter referred to as P) bipolymer obtained by copolymerization of TFE and P, or may preferably be a TFE/P type terpolymer or higher order polymer, obtained by copolymerization of other monomer in addition to TFE and P.

Such other monomer may, for example, be hexafluoropropylene, vinylidene fluoride, a perfluorovinyl ether of the formula $CF_2=CF-O-R^f$ (wherein $R^f$ is a $C_{1-8}$ saturated perfluoroalkyl group or a perfluoro(alkoxyalkyl) group), an α-olefin such as ethylene or butene (excluding propylene) and a vinyl ether such as methyl vinyl ether or ethyl vinyl ether. Such other monomers may be used alone or in combination as a mixture of two or more of them.

The copolymer composition of the TFE/P type copolymer preferably has a ratio of repeating units based on TFE/repeating units based on P=40/60 to 60/40 (molar ratio). When the copolymer composition is within such a range, the obtainable cross-linked rubber product will be excellent in the cross-linked rubber physical properties, and the heat resistance and chemical resistance will be good.

The content of repeating units based on other monomer is preferably from 0 to 30 mol %, more preferably from 0 to 15 mol %.

The Mooney viscosity of the fluoroelastomer (A) is preferably from 20 to 700, more preferably from 30 to 600, most preferably from 40 to 500. The Mooney viscosity is an index for the molecular weight, namely, the larger the Mooney viscosity, the higher the molecular weight, and the smaller the Mooney viscosity, the lower the molecular weight. Within such a range, the processability of the fluoroelastomer, and the cross-linked rubber physical properties will be good. Such a Mooney viscosity is a value to be measured in accordance with JIS K6300 using a large rotor having a diameter of 38.1 mm and a thickness of 5.54 mm at 100° C. by setting the preheating time to be one minute and a rotor rotational time to be 4 minutes.

The commercial product of the fluoroelastomer (A) may be "AFLAS 100N", "AFLAS 150C", "AFLAS 150CS" and "AFLAS 150CA", tradenames (all manufactured by ASAHI GLASS COMPANY, LIMITED).

As a method for producing the fluoroelastomer (A) to be used in the present invention, any conventional method may be used. For example, emulsion polymerization, solution polymerization, suspension polymerization or bulk polymerization may, for example, be mentioned. Further, for the initial reaction, a radical polymerization initiator, a redox polymerization initiator, heat, radiation, etc., may be employed. Among them, emulsion polymerization is preferred, whereby adjustment of the molecular weight and the copolymer composition is easy, and it is excellent in productivity.

The organic peroxide (B) is preferably an organic peroxide having a temperature of half life of one minute, which is a temperature at which its half life is one minute, being from 110 to 300° C., more preferably from 110 to 250° C., most preferably from 110 to 200° C.

Specific examples thereof include dicumyl peroxide, 1,3-bis(tert-butylperoxyisopropyl)benzene, tert-butylcumyl peroxide, cumene hydroperoxide, diisopropylbenzene hydroperoxide, tert-butylperoxybenzoate, 2,5-dimethyl-2,5-dibenzoyl peroxyhexane, di-tert-butyl peroxide, 2,5-dimethyl-2,5-di-tert-butyl peroxyhexane and dibenzoyl peroxide. Preferred is dicumyl peroxide, 1,3-bis(tert-butylperoxyisopropyl)benzene, tert-butylcumyl peroxide, tert-butylperoxybenzoate, 2,5-dimethyl-2,5-dibenzoyl peroxyhexane or di-tert-butyl peroxide. Further preferred is dicumyl peroxide, 1,3-bis(tert-butylperoxyisopropyl)benzene, tert-butylcumyl peroxide, tert-butylperoxybenzoate, 2,5-dimethyl-2,5-dibenzoyl peroxyhexane or the like.

The organic peroxide (B) may be used alone or in combination as a mixture of two or more of them.

The blend amount of the organic peroxide (B) is preferably from 0.1 to 10 parts by mass, more preferably from 0.5 to 7 parts by mass, per 100 parts by mass of the fluoroelastomer (A). Within such a range, carbon-carbon unsaturated bonds which are cross-linkable functional groups will be introduced into the fluoroelastomer (A), and a cross-linkable fluoroelastomer excellent in cross-linkability can be obtained.

The cross-linkable fluoroelastomer of the present invention is obtainable by heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol. By heat treatment, a cross-linkable fluoroelastomer remarkably excellent in cross-linkability can be obtained.

The number of carbon atoms of each component as the additive (C) is preferably from 14 to 26, more preferably from 16 to 24, most preferably from 16 to 22. Here, components having different number of carbon atoms may be used as mixed. In the case of a mixture, it means the average number of carbon atoms.

The above higher fatty acid may, for example, be behenic acid ($C_{22}$), stearic acid ($C_{18}$), palmitic acid ($C_{16}$), myristic acid ($C_{14}$) or lauric acid ($C_{12}$). Among them, stearic acid or palmitic acid is preferred, stearic acid is more preferred.

The above metal salt of a higher fatty acid may, for example, be an alkali metal salt, an alkaline earth metal salt or a tervalent metal salt of the above higher fatty acid. The alkali metal salt may, for example, be a sodium salt, a potassium salt, a barium salt, a calcium salt, a zinc salt, a magnesium salt or an aluminum salt. As specific examples of the metal salt of a higher fatty acid, as a stearate, sodium stearate, potassium stearate, barium stearate, calcium stearate, zinc stearate, magnesium stearate or aluminum stearate may, for example, be mentioned. Among them, sodium stearate or zinc stearate is more preferred.

The above ester of a higher fatty acid may, for example, be preferably a glycerate, a diglycerate, a polyethylene glycol ester, n-butyl stearate, stearic acid monoglyceride, oleic acid monoglyceride, behenic acid monoglyceride, recinoleic acid monoglyceride, oleic acid diglyceride, glycerin monopalmitate, glycerin mono 12-hydroxystearate, glycerin mono-di-palmitate, glycerin mono-di 12-hydroxystearate, glycerin diacetomonolaurate, cetyl alcohol ester of 2-ethyl hexanoic acid, an ester wax, octyl stearate, stearyl stearate or cetyl palmitate.

The above amide of a higher fatty acid may, for example, be preferably stearamide, oleamide, erucylamide, behenamide, ethylene bis-stearamide, N-stearyl erucamide, N-oleyl palmitamide or octadecylamide.

The above higher aliphatic alcohol may, for example, be preferably stearyl alcohol, coconut alcohol, cetyl alcohol, melissyl alcohol or behenyl alcohol.

The additive (C) may be used alone or in combination as a mixture of two or more of them.

The additive (C) is preferably the higher fatty acid and/or the metal salt of a higher fatty acid. The amount of the additive (C) is preferably from 0.1 to 10 parts by mass, more preferably from 0.3 to 5 parts by mass, most preferably from 0.5 to 3 parts by mass, per 100 parts by mass of the fluoroelastomer (A). Within such a range, it is possible to remarkably increase the reaction efficiency of introduction of carbon-carbon unsaturated bonds as cross-linking groups, into the fluoroelastomer (A), and to reduce the influence over the physical properties of the cross-linked rubber.

In the present invention, the heat-treating temperature of a mixture of the fluoroelastomer (A), the organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, is preferably from 110 to 380° C. Such a temperature range is consistent with the temperature for half life of one minute of the organic peroxide to be incorporated, whereby the reaction for introduction of carbon-carbon unsaturated bonds which are cross-linkable functional groups by the organic peroxide will be facilitated. The heat-treating temperature is more preferably from 150 to 320° C., further preferably from 150 to 300° C., most preferably from 180 to 300° C. Within such a range, there will be little heat decomposition of the polymer and a cross-linkable fluoroelastomer excellent in cross-linking reactivity can be obtained.

The heat-treating time is preferably from 10 seconds to 3 hours. By such a heat-treating time, a cross-linkable fluoroelastomer excellent in cross-linkability can be obtained.

The Mooney viscosity of the cross-linkable fluoroelastomer of the present invention is from 20 to 300, preferably from 20 to 270, more preferably from 30 to 240, most preferably from 30 to 200. The Mooney viscosity is an index for the molecular weight, namely, the larger the Mooney viscosity, the higher the molecular weight, and the smaller the Mooney viscosity, the lower the molecular weight. Within such a range, the processability of the fluoroelastomer, and the cross-linked rubber physical properties will be good. Such a Mooney viscosity is a value to be measured in accordance with JIS K6300 using a large rotor having a diameter of 38.1 mm and a thickness of 5.54 mm at 100° C. by setting the preheating time to be one minute and a rotor rotational time to be 4 minutes.

The cross-linkable fluoroelastomer of the present invention has an absorption peak at from 1,640 to 1,700 $cm^{-1}$ in its infrared absorption spectrum. More preferably, it has an absorption peak at from 1,660 to 1,700 $cm^{-1}$ in the infrared absorption spectrum. More preferably, it has an absorption peak at from 1,680 to 1,700 $cm^{-1}$. The absorption peak within such a range is attributable to a carbon-carbon unsaturated bond. Such an absorption peak is not observed with a fluoroelastomer (A) before the heat treatment, and accordingly, it is considered that during the heat treatment of the mixture with the organic peroxide, an unsaturated bond has been introduced by such a mechanism that a hydrogen atom of the fluoroelastomer (A) is withdrawn. The cross-linkable fluoroelastomer having an absorption peak within such a range, is remarkably excellent in the cross-linkability. Further, the peak intensity of the infrared absorption spectrum as represented by absorbance is preferably from 0.01 to 5.0, more preferably from 0.02 to 2.0, further preferably from 0.03 to 1.8, most preferably from 0.05 to 1.5. The cross-linkable fluoroelastomer having an absorption peak intensity within such a range, is remarkably excellent in the cross-linkability.

In the present invention, the heat treatment is carried out preferably by using a heating oven, an extruder, a kneader or the like.

According to the method for producing a cross-linkable fluoroelastomer of the present invention, it is preferred to knead a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C. for from 10 seconds to 3 hours by means of an extruder. The kneading time when an extruder is employed, is more preferably from 10 seconds to 30 minutes, most preferably from 10 seconds to 15 minutes. In this case, the fluoroelastomer (A), the organic peroxide (B) and the additive (C) may be separately supplied to the extruder, or (A) and (B), (A) and (C), or (B) and (C) may be mixed in advance and then supplied to the extruder. Or (A), (B) and (C) may be mixed in advance and then supplied to the extruder. An equipment used for mixing in advance is not particularly limited, and its example may be a Blender, a Henschel mixer or the like.

Further, it is also preferred that a mixture obtained by kneading the fluoroelastomer (A), particles or liquid of the organic peroxide (B) and the additive (C), is molded and heat-treated at a temperature of from 110 to 380° C. for from 10 seconds to 3 hours to produce a cross-linkable fluoroelastomer. It is preferred to use a two-roll mill or a kneader for the kneading of the fluoroelastomer (A), the organic peroxide (B) and the additive (C).

The cross-linkable fluoroelastomer composition comprising the cross-linkable fluoroelastomer of the present invention, a cross-linking agent (D) and a cross-linking assistant (E) is excellent in cross-linkability and excellent in mold-release properties.

As the cross-linking agent (D), an organic peroxide is preferred, and those known as vulcanizers for rubber may all be used. For example, dicumyl peroxide, 1,3-bis(tert-butylperoxyisopropyl)benzene, tert-butylcumyl peroxide, cumene hydroperoxide, diisopropylbenzene hydroperoxide, tert-butylperoxybenzoate, 2,5-dimethyl-2,5-dibenzoyl peroxyhexane, di-tert-butyl peroxide, 2,5-dimethyl-2,5-di-tert-butyl peroxyhexane or dibenzoyl peroxide may be mentioned. Preferred is dicumyl peroxide, 1,3-bis(tert-butylperoxyisopropyl)benzene, tert-butylcumyl peroxide, tert-butylperoxybenzoate, 2,5-dimethyl-2,5-dibenzoyl peroxyhexane or di-tert-butyl peroxide. Further preferred may, for example, be dicumyl peroxide, 1,3-bis(tert-butylperoxyisopropyl)benzene, tert-butylcumyl peroxide, tert-butylperoxybenzoate or 2,5-dimethyl-2,5-dibenzoyl peroxyhexane.

The cross-linking agent (D) may be used alone or in combination as a mixture of two or more of them.

The content of the cross-linking agent (D) is preferably from 0.3 to 10 parts by mass, more preferably from 0.3 to 5 parts by mass, most preferably from 0.5 to 3 parts by mass, per 100 parts by mass of the cross-linkable fluoroelastomer. Within such a range, it is possible to obtain a cross-linked rubber excellent in the balance of tensile strength and elongation.

As the cross-linking assistant (E), an unsaturated polyfunctional compound is preferred. By an unsaturated polyfunctional compound, the cross-linking efficiency can be made high. As such an unsaturated polyfunctional compound, conventional ones may all be used. Specific examples include triallyl cyanurate, triallyl isocyanurate, triallyl isocyanurate oligomer, trimethallyl isocyanurate, 1,3,5-triacryloylhexahydro-1,3,5-triazine, triallyl trimellitate, m-phenylenediamine bismaleimide, p-quinonedioxime, p,p'-dibenzoyl quinonedioxime, di-propargyl terephthalate, diallyl phthalate, N,N',N'',N'''-tetraallyl terephthalamide, and a vinyl group-containing siloxane oligomer such as polymethylvinyl siloxane or polymethylphenylvinyl siloxane.

Among them, triallyl cyanurate, triallyl isocyanurate or trimethallyl isocyanurate is particularly preferred, and triallyl isocyanurate is more preferred.

The cross-linking assistant (E) may be used alone or in combination as a mixture of two or more of them.

The content of the cross-linking assistant (E) is preferably from 0.1 to 10 parts by mass, more preferably from 0.5 to 7 parts by mass, per 100 parts by mass of the cross-linkable fluoroelastomer. Within such a range, it is possible to obtain cross-linked rubber physical properties having a good balance of the strength and elongation.

To the cross-linkable fluoroelastomer composition of the present invention, a reinforcing material, a filler, an additive, etc., may suitably be incorporated. As the reinforcing material and filler, a reinforcing material and filler for rubber which have been commonly used for the production of cross-linked rubber may, for example, be mentioned. For example, carbon black such as channel black, furnace black, acetylene black or thermal black, an inorganic reinforcing material such as white carbon, magnesium carbonate or surface-treated calcium carbonate, an inorganic filler such as calcium carbonate, clay, talc, silica, diatomaceous earth, alumina or barium sulfate, or other fillers, may be mentioned. As the additive, an additive such as a pigment, an antioxidant, a stabilizer, a processing aid or an internal mold release agent, may, for example, be mentioned.

Such reinforcing materials, fillers and additives may, respectively, be used alone or in combination as a mixture of two or more of them. The blend amount of the reinforcing material may suitably be selected, but it is preferably from 1 to 100 parts by mass per 100 parts by mass of the fluoroelastomer. The blend amount of the filler may suitably be selected, but it is preferably from 1 to 100 parts by mass per 100 parts by mass of the fluoroelastomer.

Further, to the cross-linkable fluoroelastomer composition of the present invention, at least one of rubbers such as other fluororubbers, EPDM, silicone rubber and acyl rubber, and resins such as fluororesins, may be incorporated.

For the production of a cross-linkable fluoroelastomer composition of the present invention, it is desirable to adequately uniformly mix the cross-linkable fluoroelastomer, the cross-linking agent (D) and the cross-linking assistant (E), and, if necessary, an oxide and/or hydroxide of a bivalent metal, a fluororubber, other reinforcing material, filler, processing aid, additive, etc. Such mixing can be carried out by means of a roll mill for kneading rubber, a kneader or a Banbury mixer which has been commonly used. The working conditions for the mixing are not particularly limited, but usually, the added blend components can adequately be dispersed and mixed in the cross-linkable fluoroelastomer by kneading at a temperature of from about 30 to 80° C. for from about 10 to 60 minutes. Further, such added blend components may be dissolved and dispersed in a suitable solvent to form a suspension solution. Otherwise, the mixing may be carried out by so-called wet mixing, which is carried out in a solvent from the beginning. In such a case, a blend composition in a solution state may be obtained by using a mixing machine such as a roll mill, a ball mill or a homogenizer.

Here, for the working conditions or operation of the mixing, the optimal conditions should better be selected depending upon the purpose or types of the materials to be used and the blend product.

The cross-linkable fluoroelastomer composition of the present invention may be formed into molded products such as seals, packings, sheets, pipes, rods, tubes, angles, channels, coated fabrics, coated plates or wire coatings by usual molding or other molding methods such as extrusion, transfer, calendering, roll coating, brush coating or impregnation. Otherwise, it may be formed also into profiles or special molding products such as sponge rubbers by various molding methods.

The cross-linkable fluoroelastomer composition of the present invention is easily cross-linked by heating.

A conventional operation may be employed as the operation for such cross-linking. As a cross-linking by heating, an operation of heating under pressure in a mold may, for example, be employed, or an operation of heating in a heating furnace or a steam oven after the composition is formed by extrusion or calender rolling may be employed. With respect to the operation conditions for the cross-linking, the optimal conditions may be selected for use depending upon the materials to be used or the blend.

The temperature for cross-linking by heating is usually at a level of from 60 to 250° C., preferably from 120 to 200° C. Further, the heating time is not particularly limited, but it is usually within a range of from one minute to three hours, preferably within a range of from 5 minutes to two hours, depending upon the type of the organic peroxide. If the heating temperature is increased, the heating time may be shortened. Further, re-heating treatment of the obtainable cross-linked product may also be employed, and such may be useful for improvement of the physical properties. For example, re-heating treatment at a temperature of from 150 to 250° C., preferably from 180° C. to 230° C., for from about 2 to 25 hours, may be employed.

It is preferred to obtain a cross-linked rubber product by cross-linking the cross-linkable fluoroelastomer composition obtained by mixing the cross-linkable fluoroelastomer of the present invention, the cross-linking agent (D) and the cross-linking assistant (E) by applying an ionizing radiation thereto. Further, it is also preferred to obtain a cross-linked rubber product by cross-linking the cross-linkable fluoroelastomer of the present invention by applying an ionizing radiation thereto without incorporating the cross-linking agent (D) and the cross-linking assistant (E).

As the ionizing radiation, electron rays or γ-rays may, for example, be mentioned. The exposure dose by irradiation with electron rays may suitably be selected, but it is usually preferably from 1 to 300 kGy, more preferably from 10 to 200 kGy.

As a specific example of the cross-linking by irradiation with an ionizing radiation, it is preferred to cross-link a molded product obtained by extruding the cross-linkable fluoroelastomer of the present invention or the cross-linkable fluoroelastomer composition by applying an ionizing radiation thereto to obtain a cross-linked rubber product. Further, it is also preferred that a suspension solution having the cross-linkable fluoroelastomer or the cross-linkable fluoroelastomer composition of the present invention dissolved and dispersed in a suitable solvent, is applied to a substrate or the like and dried, and then, the obtained coating film is irradiated with an ionizing radiation.

The cross-linkable fluoroelastomer of the present invention and the fluoroelastomer composition are particularly suitable to the application for electric wire coating materials. In the case of the application for electric wire coating materials, it is preferred to coat an electric wire with the fluoroelastomer composition of the present invention, followed by heating and cross-linking. Further, it is also preferred to coat an electric wire with the cross-linkable fluoroelastomer of the present invention itself or the cross-linkable fluoroelastomer composition, followed by cross-linking by applying an ionizing radiation thereto. In the case of cross-linking by applying an ionizing radiation, the cross-linking assistant (E) is preferably added in order to improve the cross-linkability. The content of the cross-linking assistant (E) is preferably from 0.1 to 10 parts by mass, more preferably from 0.5 to 7 parts by mass, per 100 parts by mass of the cross-linkable fluoroelastomer.

Further, in the application for electric wire coating materials, a fluororesin is preferably added to the cross-linkable fluoroelastomer of the present invention. The fluororesin to be added is preferably one which will not be decomposed by an ionizing radiation, particularly preferably an ethylene/TFE type copolymer. When a fluororesin such as an ethylene/TFE type copolymer is added to the cross-linkable fluoroelastomer of the present invention or its composition, it is preferred that a composition having them kneaded in advance is coated on an electric wire, followed by cross-linking by heating or applying an ionizing radiation. As the ethylene/TFE type copolymer, an ethylene/TFE copolymer or an ethylene/TFE type terpolymer or a higher order polymer obtained by copolymerization of other monomer in addition to ethylene and TFE. As other monomer, other monomers described with respect to the TFE/P type copolymer may be mentioned. The amount of the fluororesin is preferably from 90/10 to 10/90, more preferably from 90/10 to 30/70, as a mass ratio of cross-linkable fluoroelastomer/fluororesin.

EXAMPLES

Now, the present invention will be described in further detail with reference to Examples, but it should be understood that the present invention is by no means limited thereto. In Examples, "parts" means "parts by mass".

Further, in the respective Examples and Comparative Examples, the following operations were carried out.

[Infrared Absorption Intensity]

Measurements of the position and the intensity of an absorption peak in infrared (IR) were carried out as follows. 1 g of the fluoroelastomer after heat treatment was sampled and pressed to a thickness of about 0.2 mm by hot pressing at 170° C. for 5 minutes, and using this pressed product, measurement of the transmission infrared absorbance was carried out by FT-IR (PROTEGE460, manufactured by Nicolet).

For the intensity of the absorption peak at from 1,640 to 1,700 $cm^{-1}$, the intensity of the absorption peak top present at from 1,640 to 1,700 $cm^{-1}$ is obtained, as represented by absorbance, from the height perpendicular from a line connecting the intensities at two points of 1,630 $cm^{-1}$ and 1,710 $cm^{-1}$, and represented by the absorbance calculated as corresponding to a thickness of 0.2 mm.

[Moony Viscosity]

In accordance with JIS K6300, using a large rotor having a diameter of 38.1 mm and a thickness of 5.54 mm, measurements were carried out at 100° C. by setting the preheating time to be one minute and the rotor rotational time to be 4 minutes.

[Cross-Linkability]

A fluoroelastomer composition was subjected to measurement of the cross-linking properties by means of a cross-linking property measuring apparatus (RPA, manufactured by Alpha Technologies) at 177° C. for 12 minutes under a condition of an amplitude of 3 degrees. MH represents the maximum value of the torque, ML represents the minimum value of the torque, and MH-ML represents the cross-linking density (also called the vulcanization density) and the bigger the value is, the more excellent the cross-linkability is.

Example 1

To 100 parts of a TFE/P copolymer 1 (copolymer composition: TFE/P=56/44 (mol %), Mooney viscosity: 140) produced in accordance with the production method for a fluoroelastomer disclosed in JP-A-55-127412, 1 part of sodium stearate was added, followed by grinding and mixing for 3 minutes at 20 Hz by a 20 L Henschel mixer to obtain a fluoroelastomer mixture. The obtained fluoroelastomer composition was put into a single screw feeding apparatus A and 1,3-bis(tert-butylperoxyisopropyl)benzene (tradename "Perbutyl P" manufactured by NOF CORPORATION, temperature for half life of one minute: 175.4° C.) was put into another single screw feeding apparatus B. With the ratio of 2 parts from the feeding apparatus B per 100 parts from the feeding apparatus A, they were simultaneously and continuously put into a double screw extruder set at 200° C. and extruded for a retention time of 2 minutes to obtain a cross-linkable fluoroelastomer. The Moony viscosity of the obtained cross-linkable fluoroelastomer was 115. Further, the infrared absorption spectrum of the obtained cross-linkable fluoroelastomer is shown in FIG. 1.

Example 2

Extrusion was carried out to obtain a cross-likable fluoroelastomer in the same manner as in Example 1 except that the extrusion temperature in Example 1 was set to 250° C.

Example 3

Extrusion was carried out to obtain a cross-likable fluoroelastomer in the same manner as in Example 1 except that zinc stearate was used instead of sodium stearate in Example 1.

Example 4

Extrusion was carried out to obtain a cross-likable fluoroelastomer in the same manner as in Example 1 except that stearic acid was used instead of sodium stearate in Example 1.

Comparative Example 1

Extrusion was carried out to obtain a fluoroelastomer in the same manner as in Example 1 except that talc was used instead of sodium stearate in Example 1. The infrared absorption spectrum of the obtained fluoroelastomer is shown in FIG. 1.

Comparative Example 2

Extrusion was carried out to obtain a fluoroelastomer in the same manner as in Example 1 except that sodium stearate in Example 1 was not used. The infrared absorption spectrum of the obtained fluoroelastomer is shown in FIG. 1.

Comparative Example 3

Extrusion was carried out to obtain a fluoroelastomer in the same manner as in Example 1 except that sodium stearate in Example 1 was not used and nothing was added from the feeding apparatus B. The infrared absorption spectrum of the obtained fluoroelastomer is shown in FIG. 1. There is no peak at from 1,640 to 1,700 cm$^{-1}$.

Examples 5 to 8

Using the cross-likable fluoroelastomers produced in the above Examples 1 to 4, various blend materials were uniformly mixed by means of a two roll mill in accordance with the components and blend amounts as shown in Table 3, to prepare cross-likable fluoroelastomer compositions. The cross-linkability of these cross-likable fluoroelastomer compositions was measured. Further, these cross-likable fluoroelastomer compositions were primarily cross-linked by pressing at 170° C. for 20 minutes and then, secondarily cross-linked under conditions of 200° C. for 4 hours in an oven. By using the test specimens thus obtained, the values of tensile strength, tensile elongation and compression set were measured. These results are shown in Table 3.

Comparative Examples 4 and 5

Using the fluoroelastomers obtained in the above Comparative Examples 1 and 2, various blend materials were uniformly mixed by means of a two roll mill in accordance with the components and blend amounts as shown in Table 3, to prepare fluoroelastomer compositions. The cross-linkability of these fluoroelastomer compositions was measured. Further, these fluoroelastomer compositions were primarily cross-linked by pressing at 170° C. for 20 minutes and then, secondarily cross-linked under conditions of 200° C. for 4 hours in an oven. By using the test specimens thus obtained, the values of tensile strength, tensile elongation and compression set were measured.

Comparative Example 6

Using the fluoroelastomer obtained in the above Comparative Example 3, various blend materials were uniformly mixed by means of a two roll mill in accordance with the components and blend amounts as shown in Table 3, to prepare a fluoroelastomer composition. However, the fluoroelastomer composition was not cross-linked.

Example 9

Extrusion was carried out to obtain a cross-likable fluoroelastomer in the same manner as in Example 2 except that a TFE/P copolymer 2 (copolymer composition: TFE/P=56/44 (mol %), Mooney viscosity: 250) produced in accordance with the production method for a fluoroelastomer disclosed in JP-A-55-127412 was used instead of the TFE/P copolymer 1 in Example 2.

Example 10

Extrusion was carried out to obtain a cross-likable fluoroelastomer in the same manner as in Example 2 except that a TFE/P copolymer 3 (copolymer composition: TFE/P=56/44 (mol %), Mooney viscosity: 350) produced in accordance with the production method for a fluoroelastomer disclosed in JP-A-55-127412 was used instead of the TFE/P copolymer 1 in Example 2.

Example 11

Extrusion was carried out to obtain a cross-likable fluoroelastomer in the same manner as in Example 10 except that in Example 10, 5 parts of 1,3-bis(tert-butylperoxyisopropyl)benzene was put from the single screw feeding apparatus B.

Examples 12 to 14

Using the cross-likable fluoroelastomers produced in the above Examples 9 to 11, various blend materials were uniformly mixed by means of a two roll mill in accordance with the components and blend amounts as shown in Table 6, to prepare cross-likable fluoroelastomer compositions. The cross-linkability of these cross-likable fluoroelastomer compositions was measured. Further, these cross-likable fluoroelastomer compositions were primarily cross-linked by pressing at 170° C. for 20 minutes and then, secondarily cross-linked under conditions of 200° C. for 4 hours in an oven. By using the test specimens thus obtained, the values of tensile strength, tensile elongation and compression set were measured. These results are shown in Table 6.

Example 15

Figure 2:
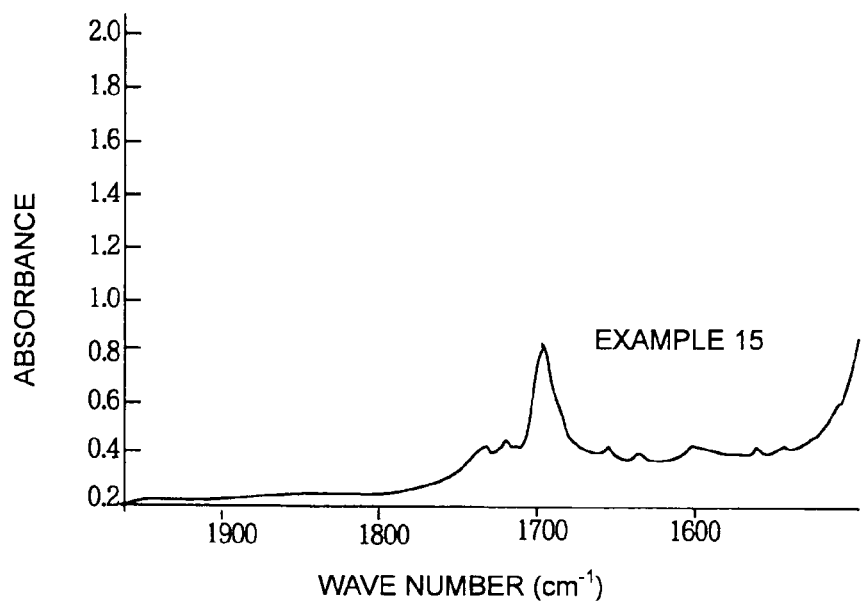
FIG. 2 is a chart showing infrared absorption spectra of an another embodiment of the cross-linkable fluoroelastomer of the present invention.

To 100 parts of a TFE/P copolymer 1 (copolymer composition: TFE/P=56/44 (mol %), Mooney viscosity: 140) produced in accordance with the production method for a fluoroelastomer disclosed in JP-A-55-127412, 1 part of sodium stearate and 2 parts of 1,3-bis(tert-butylperoxyisopropyl)benzene (tradename "Perbutyl P" manufactured by NOF CORPORATION, temperature for half life of one minute: 175.4° C.) were uniformly mixed by means of a two roll mill. The obtained mixture was heat-treated in an oven at 200° C. for 10 minutes to obtain a cross-likable fluoroelastomer. The Moony viscosity was 120. The infrared absorption spectrum of the obtained cross-linkable fluoroelastomer is shown in FIG. 2.

Example 16

Heat treatment by an oven was carried out to obtain a cross-likable fluoroelastomer in the same manner as in Example 15 except that 5 parts of sodium stearate was added instead of 1 part in Example 15.

Example 17

Heat treatment was carried out to obtain a cross-likable fluoroelastomer in the same manner as in Example 15 except that the treatment was carried out at 250° C. in an oven instead of at 200° C. in Example 15.

Example 18

Heat treatment by an oven was carried out to obtain a cross-likable fluoroelastomer in the same manner as in Example 17 except that 5 parts of sodium stearate was added instead of 1 part in Example 17.

Example 19

Using the cross-likable fluoroelastomer obtained in the above Example 1, an extruded tube is prepared and cross-linked by irradiation with γ-rays of 100 kGy, whereby an excellent cross-linked tubular product can be obtained.

Example 20

The cross-likable fluoroelastomer obtained in the above Example 1, an ethylene/TFE copolymer (tradename "Fluon ETFE C-88AX" manufactured by Asahi Glass Company, Limited) and Many' isocyanurate (tradename "TAIC" manufactured by Nippon Kasei Chemical Co., Ltd.) are mixed in a mass ratio of 50/50/5, and the mixture is applied to an electric wire by extrusion to produce a molded product, which is cross-linked by irradiation with γ-rays of 100 kGy, whereby an excellent coated electric wire can be obtained.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Composition of mixture | TFE/P copolymer 1 | 100 | 100 | 100 | 100 | 100 | 100 | 100 |
|  | Sodium stearate | 1 | 1 | — | — | — | — | — |
|  | Zinc stearate | — | — | 1 | — | — | — | — |
|  | Stearic acid | — | — | — | 1 | — | — | — |
|  | Talc | — | — | — | — | 1 | — | — |
| Mixing conditions by Henschel mixer |  | 20 Hz, 3 min. | 20 Hz, 3 min. | 20 Hz, 3 min. | 20 Hz, 3 min. | 20 Hz, 3 min. | 20 Hz, 3 min. | 20 Hz, 3 min. |

TABLE 2

|  |  | Example 1 | Example 2 | Example 3 | Example 4 | Comparative Example 1 | Comparative Example 2 | Comparative Example 3 |
|---|---|---|---|---|---|---|---|---|
| Mixture |  | 100 | 100 | 100 | 100 | 100 |  |  |
| Non-mixture |  |  |  |  |  |  | 100 | 100 |
| Perbutyl P |  | 2 | 2 | 2 | 2 | 2 | 2 | — |
| Heat treatment temperature |  | 200° C. | 250° C. | 200° C. | 200° C. | 200° C. | 200° C. | 200° C. |
| Heat treatment time |  | 2 min. | 2 min. | 2 min. | 2 min. | 2 min. | 2 min. | 2 min. |
| IR peak position | 1,640 to 1,700 $cm^{-1}$ | Peak observed | Peak observed | Peak observed | Peak observed | Peak observed | Peak observed | No peak observed |
| IR peak intensity | 1,640 to 1,700 $cm^{-1}$ | 1.02 | 0.85 | 0.80 | 0.97 | 0.06 | 0.35 | — |
| Mooney viscosity |  | 115 | 108 | 105 | 103 | 83 | 87 | 121 |

TABLE 3

|  |  | Example 5 | Example 6 | Example 7 | Example 8 | Comparative Example 4 | Comparative Example 5 | Comparative Example 6 |
|---|---|---|---|---|---|---|---|---|
| Cross-linkable fluoro-elastomer | Ex. 1 | 100 | — | — | — | — | — |  |
|  | Ex. 2 | — | 100 | — | — | — | — |  |
|  | Ex. 3 | — | — | 100 | — |  |  |  |
|  | Ex. 4 | — | — | — | 100 | — | — |  |
|  | Comp. Ex. 1 | — | — | — | — | 100 | — | — |
|  | Comp. Ex. 2 | — | — | — | — | — | 100 |  |
|  | Comp. Ex. 3 |  |  |  | — |  |  | 100 |
| MT carbon |  | 30 | 30 | 30 | 30 | 30 | 30 | 30 |
| TAIC |  | 5 | 5 | 5 | 5 | 5 | 5 | 5 |
| Perbutyl P |  | 1 | 1 | 1 | 1 | 1 | 1 | 1 |
| Na stearate |  | 1 | 1 | 1 | 1 | 1 | 1 | 1 |

TABLE 3-continued

|  |  | Example 5 | Example 6 | Example 7 | Example 8 | Comparative Example 4 | Comparative Example 5 | Comparative Example 6 |
|---|---|---|---|---|---|---|---|---|
| Crosslinking conditions | Primary crosslinking | 170° C. *20 min. | 170° C. *20 min. | 170° C. *20 min. | 170° C. *20 min. | 170° C. *20 min. | 170° C. *20 min. | 170° C. *20 min. |
|  | Secondary crosslinking | 200° C. *4 hrs. | 200° C. *4 hrs. | 200° C. *4 hrs. | 200° C. *4 hrs. | 200° C. *4 hrs. | 200° C. *4 hrs. | 200° C. *4 hrs. |
| Physical properties | Crosslinking density (MH-ML) | 37.0 | 35.6 | 33.8 | 37.9 | 26.4 | 27.4 | — |
|  | Tensile strength (MPa) | 15.8 | 16.2 | 14.7 | 16.7 | 11.9 | 12.7 | — |
|  | Tensile elongation (%) | 268 | 287 | 277 | 257 | 377 | 376 | — |
|  | Compression set (%) | 27 | 27 | 31 | 34 | 44 | 39 | — |

TABLE 4

|  |  | Example 2 | Example 9 | Example 10 | Example 11 |
|---|---|---|---|---|---|
| Composition of mixture | TFE/P copolymer 1 | 100 | — | — | — |
|  | TFE/P copolymer 2 | — | 100 | — | — |
|  | TFE/P copolymer 3 | — | — | 100 | 100 |
|  | Sodium stearate | 1 | 1 | 1 | 1 |
| Mixing conditions by Henschel mixer |  | 20 Hz, 3 min. | 20 Hz, 3 min. | 20 Hz, 3 min. | 20 Hz, 3 min. |

TABLE 5

|  |  | Example 2 | Example 9 | Example 10 | Example 11 |
|---|---|---|---|---|---|
| Mixture |  | 100 | 100 | 100 | 100 |
| Non-mixture |  |  |  |  |  |
| Perbutyl P |  | 2 | 2 | 2 | 5 |
| Heat treatment temperature |  | 250° C. | 250° C. | 250° C. | 250° C. |
| Heat treatment time |  | 2 min. | 2 min. | 2 min. | 2 min. |
| IR peak position | 1,640 to 1,700 $cm^{-1}$ | Peak observed | Peak observed | Peak observed | Peak observed |
| IR peak intensity | 1,640 to 1,700 $cm^{-1}$ | 0.85 | 0.90 | 0.98 | 1.20 |
| Mooney viscosity |  | 108 | 150 | 220 | 180 |

TABLE 6

|  |  | Example 6 | Example 12 | Example 13 | Example 14 |
|---|---|---|---|---|---|
| Cross-linkable fluoro-elastomer | Ex. 2 | 100 | — | — | — |
|  | Ex. 9 | — | 100 | — | — |
|  | Ex. 10 | — | — | 100 | — |
|  | Ex. 11 | — | — | — | 100 |
| MT carbon |  | 30 | 30 | 30 | 30 |
| TAIC |  | 5 | 5 | 5 | 5 |
| Perbutyl P |  | 1 | 1 | 1 | 1 |
| Na stearate |  | 1 | 1 | 1 | 1 |
| Crosslinking conditions | Primary crosslinking | 170° C. *20 min. | 170° C. *20 min. | 170° C. *20 min. | 170° C. *20 min. |
|  | Secondary crosslinking | 200° C. *4 hrs. | 200° C. *4 hrs. | 200° C. *4 hrs. | 200° C. *4 hrs. |
| Physical properties | Crosslinking density (MH-ML) | 35.6 | 51.1 | 55.6 | 61.1 |
|  | Tensile strength (MPa) | 16.2 | 21.1 | 25.1 | 23.3 |
|  | Tensile elongation (%) | 287 | 250 | 25.9 | 196 |
|  | Compression set (%) | 27 | 27 | 18 | 14 |

Industrial Applicability

The cross-linked rubber molded product obtained from the cross-linkable fluoroelastomer of the present invention and its composition is formed into molded products such as seals, packings, sheets, pipes, rods, tubes, angles, channels, coated fabrics, coated plates, electric wire-coating materials, profiles, special molded products or sponge rubbers. Specific examples of the application may be a highly heat resistant electric wire, chemical resistant electric wire, a highly insulating electric wire, a high voltage transmission line, a cable for vehicles, a cable for airplanes, a cable for ships, a chemical resistant hose, a heat resistant hose, a chemical resistant seal material, a heat resistant seal material, an oil seal for vehicles, an oil seal for airplanes, an oil seal for ships, a shaft seal for vehicles, a shaft seal for airplanes, a shaft seal for ships, a chemical resistant packing, a heat resistant packing, parts for oil drilling equipment, parts for petrochemical plant equipment, parts for petroleum transfer equipment, parts for semiconductor production apparatus, parts for liquid crystal display production apparatus, parts for food production apparatus, parts for beverage production apparatus, parts for medicine production apparatus and the like.

The entire disclosure of Japanese Patent Application No. 2007-300223 filed on Nov. 20, 2007 including specification, claims, drawings and summary is incorporated herein by reference in its entirety.

What is claimed is:

1. A method for producing a cross-linkable fluoroelastomer, which comprises heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, and an amide of a $C_{12-28}$ higher fatty acid and a $C_{12-28}$ higher aliphatic alcohol, at a temperature of from 110 to 380° C. to produce said cross-linkable fluoroelastomer, wherein the cross-linkable fluoroelastomer has an absorption peak at from 1640 to 1700 cm$^{-1}$, wherein the peak intensity of the absorption at from 1640 to 1700 cm$^{-1}$ of the infrared absorption spectrum as represented by absorbance of a hot pressed sample having a thickness of 0.2 mm is from 0.05 to 1.5, and wherein the fluoroelastomer (A) has no absorption peak at from 1640 to 1700 cm$^{-1}$.

2. The method for producing a cross-linkable fluoroelastomer according to claim 1, wherein the cross-linkable fluoroelastomer produced has a Mooney viscosity of from 20 to 300.

3. The method for producing a cross-linkable fluoroelastomer according to claim 1, wherein the additive (C) is a $C_{12-28}$ higher fatty acid and/or its metal salt.

4. The method for producing a cross-linkable fluoroelastomer according to claim 1, wherein the blend ratio of fluoroelastomer (A)/organic peroxide (B)/additive (C) in the mixture is 100/0.1 to 10/0.1 to 10 (mass ratio).

5. The method for producing a cross-linkable fluoroelastomer according to claim 1, wherein the fluoroelastomer (A) is a tetrafluoroethylene/propylene copolymer.

6. The method for producing a cross-linkable fluoroelastomer according to claim 1, wherein the temperature for half life of one minute of the organic peroxide (B) is from 110 to 200° C.

7. The method for producing a cross-linkable fluoroelastomer according to claim 1, which comprises kneading and heat-treating a mixture of a fluoroelastomer (A), an organic peroxide (B) and at least one additive (C) selected from the group consisting of a $C_{12-28}$ higher fatty acid, a metal salt of a $C_{12-28}$ higher fatty acid, an ester of a $C_{12-28}$ higher fatty acid, an amide of a $C_{12-28}$ higher fatty acid and a $C_{12-28}$ higher aliphatic alcohol, at a temperature of from 110 to 380° C. by means of an extruder.

8. The method according to claim 1, further comprising mixing the cross-linkable fluoroelastomer with a vulcanizer (D) and a vulcanization assistant (E) to produce a cross-linkable fluoroelastomer composition.

9. The method according to claim 8, further comprising cross-linking the cross-linkable fluoroelastomer composition.

10. The method according to claim 9, wherein said crosslinking is accomplished by applying an ionizing radiation to the cross-linkable fluoroelastomer composition.

11. The method for producing a cross-linkable fluoroelastomer according to claim 1, wherein the cross-linkable fluoroelastomer produced has a Mooney viscosity of from 30 to 200.

12. The method for producing a cross-linkable fluoroelastomer according to claim 11, wherein fluoroelastomer (A) has no carbon-carbon unsaturated bonds.

13. The method for producing a cross-linkable fluoroelastomer according to claim 12, wherein the fluoroelastomer (A) is a tetrafluoroethylene/propylene copolymer.

14. The method for producing a cross-linkable fluoroelastomer according to claim 1, wherein fluoroelastomer (A) has no carbon-carbon unsaturated bonds.

* * * * *